(No Model.)
J. M. DAUGHERTY.
OIL CUP.
No. 475,387. Patented May 24, 1892.
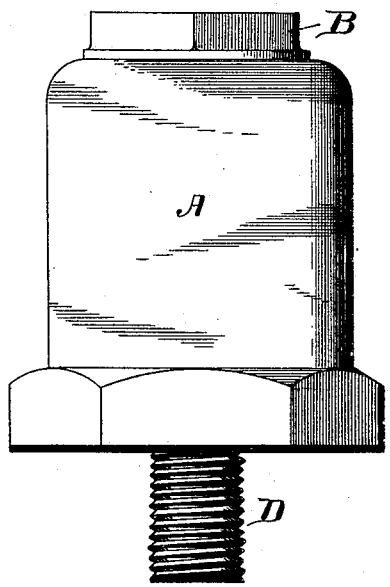
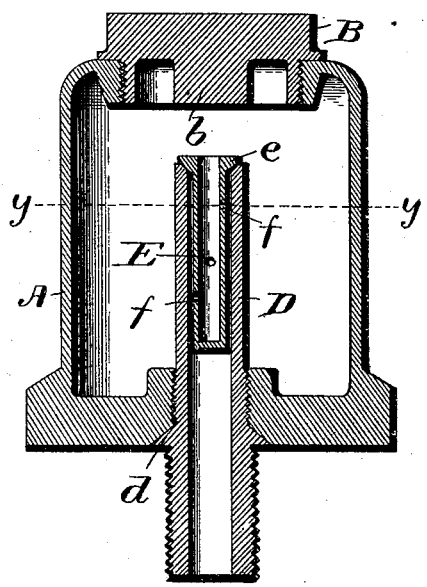
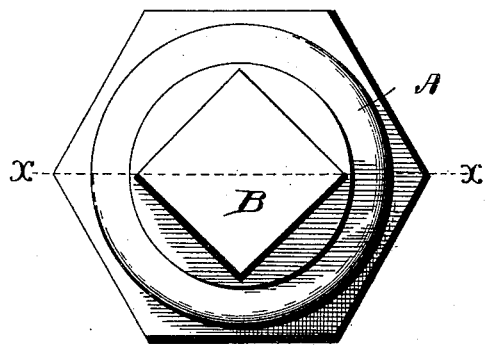
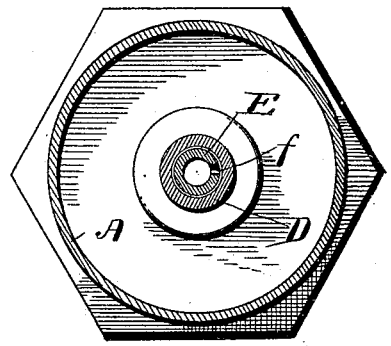
Witnesses
Albert Speiden
Van Buren Hillyard
Inventor
Joseph M. Daugherty,
By his Attorneys
R. H. Lacey

UNITED STATES PATENT OFFICE.

JOSEPH MONTGOMERY DAUGHERTY, OF UHRICHSVILLE, OHIO.

OIL-CUP.

SPECIFICATION forming part of Letters Patent No. 475,387, dated May 24, 1892.

Application filed January 18, 1892. Serial No. 418,469. (No model.)

*To all whom it may concern:*

Be it known that I, JOSEPH MONTGOMERY DAUGHERTY, a citizen of the United States, residing at Uhrichsville, in the county of Tuscarawas and State of Ohio, have invented certain new and useful Improvements in Oil-Cups; and I do hereby declare the following to be a full, clear, and exact description of the invention, such as will enable others skilled in the art to which it appertains to make and use the same.

This invention relates to lubricators for wrist-pins, eccentrics, crank-pins, &c.

The object of the invention is to secure a regular feed proportionate to the movement of the parts to which the lubricator is applied.

The improvement consists of the novel features and the peculiar construction and combination of the parts, which will be hereinafter more fully described and claimed, and which are shown in the annexed drawings, in which—

Figure 1 is a side elevation of a lubricator embodying my invention. Fig. 2 is a central vertical section of the device on the line X X of Fig. 3. Fig. 3 is a top plan view of the device. Fig. 4 is a horizontal section on the line Y Y of Fig. 2.

The vessel A of proper size is centrally apertured in its base and provided with a threaded opening in its top, which is closed by the plug B. The body and base of the vessel are integral, being cast together. The tubular stem D is screwed into the aperture in the base of the vessel and extends within the latter a proper distance, terminating a short distance from the top of the said vessel. The tapering flange $d$, formed on the stem D at a short distance from the lower end of the said stem, enters a correspondingly-shaped recess in the base of the vessel and forms a tight joint therewith to prevent the escape of any lubricant. The exposed portion of the said stem D is exteriorly threaded to screw into the part to be lubricated. The upper end of the stem D is flared from the bore outward to form a seat for the head $e$ on the sliding tubular cup E, which is located within the stem D and which is closed at its lower end, the sides being apertured, as shown at $f$. This cup E is adapted to have a free longitudinal movement within the stem D, being limited in its upward movement by the extension $b$ on the under side of the plug B.

The device is attached to the part to be lubricated by means of stem D in the usual manner, and the vessel is filled with oil through the opening in the top thereof after the plug has been removed. After the vessel has been supplied with the proper amount of oil the plug B is screwed to place. The air within the vessel, compressed by the screwing home of the plug, forces some of the oil into cup E and out through the openings $f$ onto the sides of the stem D, by which latter the oil is conveyed to the part to be lubricated. By providing a series of openings $f$ and locating them at different levels and on different sides of the cup E ample provision is had for the feed of the oil at all times, because it would be impossible to have all the said openings closed at the same time. Hence the oil will be properly fed in the efficient service of the device. After the vessel has been filled and as the plug is adjusting or screwing home the bearing receives a good oiling, (regular sized vessel, about a tablespoonful will be displaced by the compressed air,) which serves to clean the feeds and otherwise put the lubricator in good working order. In the throw of the bearing the cup E is lifted and the oil passes down between the sides of the said cup and the said stem and follows the sides of the stem to the bearing. Should the throw be insufficient to move the cup, the oil will enter the cup and pass through openings $f$ and down the sides of the stem, as before mentioned, and the bearing or part to be lubricated.

Having thus described my invention, what I claim, and desire to secure by Letters Patent, is—

1. In a lubricator, the combination, with the vessel having a tubular stem projected up from the bottom thereof to within a short distance of the top, of a tubular cup placed within the open end of the said stem and adapted to slide therein and having holes in its sides, substantially as and for the purpose described.

2. In a lubricator, the combination, with the vessel having a tubular stem projected within the same from the bottom, the top of the stem having a flaring seat, of a tubular cup located within the upper end of the stem and having a head which corresponds to the shape of the seat formed at the upper end of the said stem and having holes in its sides, substantially as and for the purpose described.

3. The hereinbefore shown and described lubricator, comprising vessel A, tubular stem D, screwed into the base of the vessel and having tapering flange $d$, which enters a correspondingly-shaped recess in the base of the vessel and having a flaring seat at its upper end, the tubular cup E, having head $e$, by means of which the said cup is supported within the said stem, and having openings in its sides, and the plug B to close the upper end of the vessel and limit the upward movement of the said cup E, substantially as described.

In testimony whereof I affix my signature in presence of two witnesses.

JOSEPH MONTGOMERY DAUGHERTY.

Witnesses:
L. M. SIMPSON,
J. H. O'BRIEN.